United States Patent [19]

Charransol et al.

[11] 4,071,702
[45] Jan. 31, 1978

[54] TIME DIVISION EXCHANGE AND A METHOD FOR THE RECONFIGURATION OF THIS EXCHANGE

[75] Inventors: Pierre Charransol; Jacques Hauri; Serge Fontana, all of Paris, France

[73] Assignee: Thomson-CSF, Paris, France

[21] Appl. No.: 659,631

[22] Filed: Feb. 20, 1976

[30] Foreign Application Priority Data

Feb. 25, 1975 France .................................. 75 05799

[51] Int. Cl.² ........................................... H04Q 11/04
[52] U.S. Cl. ........................... 179/15 AT; 179/18 EA; 179/18 FC
[58] Field of Search ........ 179/15 AT, 15 AQ, 18 FC, 179/18 EA, 18 ES

[56] References Cited

U.S. PATENT DOCUMENTS

| | | | |
|---|---|---|---|
| 3,419,683 | 12/1968 | Michael | 179/18 FC |
| 3,492,435 | 1/1970 | Inose | 179/18 FC |
| 3,578,917 | 5/1971 | Grandjean | 179/18 EA |

*Primary Examiner*—David L. Stewart
*Attorney, Agent, or Firm*—Cushman, Darby & Cushman

[57] ABSTRACT

The invention relates to time-division exchanges in which the connection between the subscribers is established successively in time at the same rate as a sampling of telephone signals. It consists in offering to each subscriber circuit two incoming channels and two outgoing channels, the choice between which is made by a memory comprising an additional bit reserved for this choice.

4 Claims, 2 Drawing Figures

FIG. 1

TIME DIVISION EXCHANGE AND A METHOD FOR THE RECONFIGURATION OF THIS EXCHANGE

This invention relates to a time-division exchange, in which the connection between the subscribers is established successively in time at the same rate as a sampling of telephone signals. The invention also relates to the methods for reshaping an exchange of this kind.

These signals are generally sampled at a frequency of 8 kc/s, after which the value of each sample is coded by a number of 8 bits. In most cases, this is followed by concentration which makes it possible for example to reduce the number of subscribers capable of being simultaneously connected from 256 to 32, the others awaiting a free connection. The degree of this concentration is governed by the traffic expected on the subscriber lines which is known statistically. In general, the concentration circuits then deliver a frame of 32 channels multiplexed in time which is supported by a so-called multiplex junction circuit. It is also possible to carry out concentration with analogue samples, followed by encoding.

The above-mentioned numerical values are not critical, although they are generally used because of national and international standards.

Automatic switching systems of the kind in question are described in particular in French patent applications Nos. 71.09494 and 71.07 697.

One significant problem is to guarantee adequate safety of operation in the event of failure of an element so that, instead of all the lines served by the automatic switching system having to be taken out of service, the blocking level is merely increased to a small extent.

Hitherto, the only known solutions to this problem involve doubling almost all the equipment used.

In accordance with the present invention, a time-division exchange is provided for connecting a plurality of incoming subscriber circuits to a plurality of output subscriber circuits, said exchanger comprising:
  a plurality of concentration circuits organized in input pairs of two input element; each of said incoming subscriber circuits being connected to the two elements of one of said input pairs;
  a plurality of switching circuits; each of said switching circuits being connected to two said input elements pertaining to two of said input pairs and this connection being done by an input PCM junction common to said two input elements;
  a plurality of deconcentration circuits organized in output pairs of two output elements; each of said switching circuits being connected to two of said output elements pertaining to two of said input pairs, this connection being done by an output PCM junction common to said two output elements, and each of said output subscriber circuits being connected to the two elements of one of said output pairs;
  a plurality of concentration control units; each of said concentration control units being connected to two said input elements corresponding to a common input PCM junction, and being capable of controlling the multiplexing on said common input PCM junction of input signals coming from said two input elements; and
  a plurality of deconcentration control units; each of said deconcentration control units being connected to two said output elements corresponding to a common output PCM junction, and being capable of controlling the demultiplexing out of said common output PCM junction of output signals coming into said two output elements.

For a better understanding of the invention, and to show how the same may be carried into effect, reference will be made to the ensuing description and to the attached figures among which:

Figure 1:
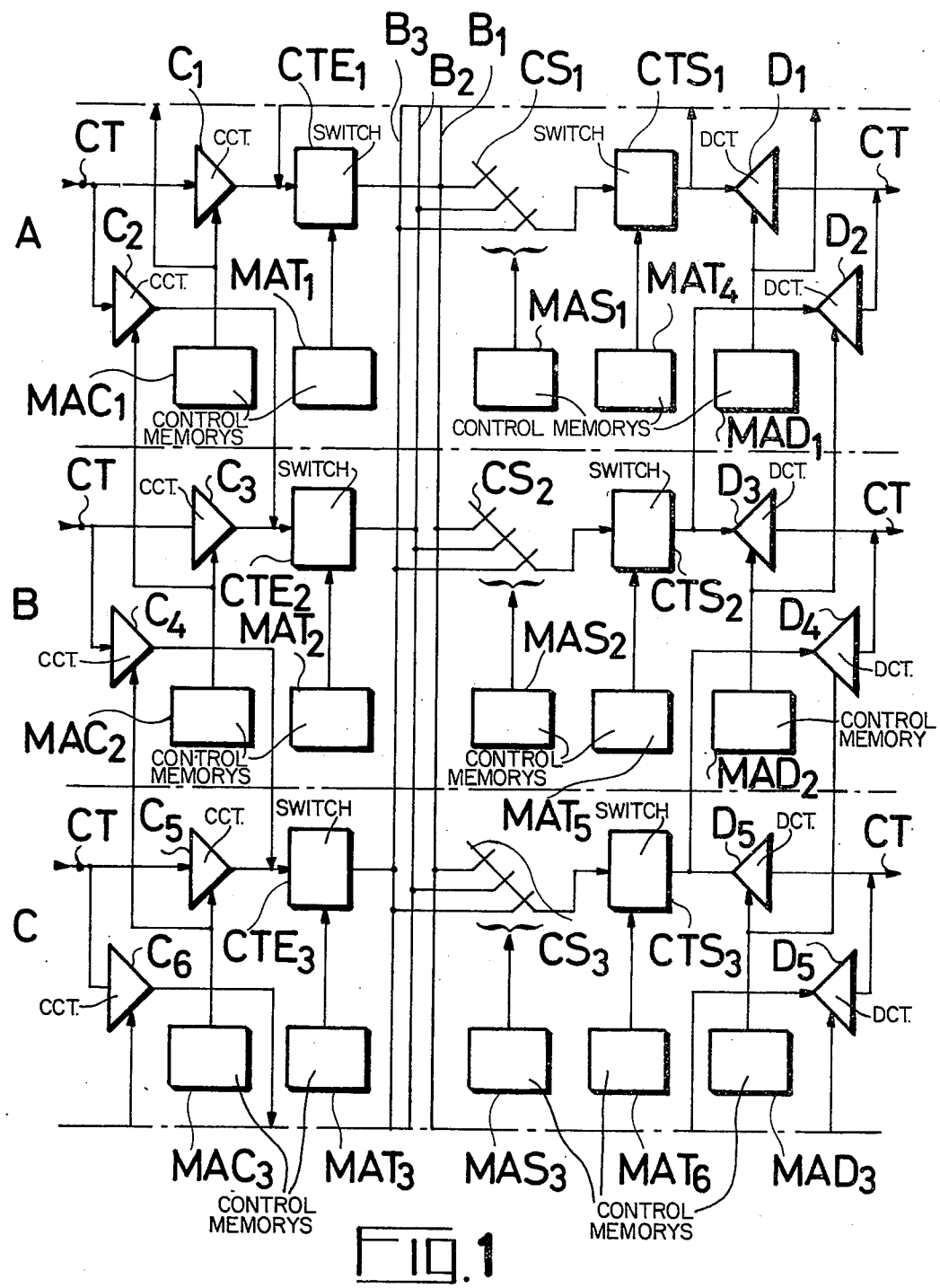
FIG. 1 illustrates a partial plan of an exchange according to the invention.

FIG. 1 diagrammatically illustrates three sections of an exchange according to the invention which comprises any number of such sections. We shall call these sections A, B, C. FIG. 1 does not show the control unit which co-ordinates operations in known manner by fixing the content of the various memories MAC, MAT, and MAD. Similarly, the connections have been represented by single lines which do not in any way limit the number of wires and signals passing through them.

The signals of each of the subscriber lines are sampled and then coded in the terminal circuits which we shall denote in the drawing by the connections CT which terminate there. They then enter the concentration circuits $C_1$ to $C_6$. In the opposite direction, the signals issuing from the deconcentration circuits $D_1$ to $D_6$ are delivered to the terminal circuits CT where they are decoded and then delivered to the corresponding subscriber lines. Only one pair of concentration circuits per section is described here in the interests of simplicity, although this is not meant in any way to limit the invention. Each section may contain $n$ pairs of concentration circuits.

Each pair of concentration circuits, such as $C_1C_2$ for the section A for example, receives for example 256 C T connected in parallel to both. The concentration circuit in service, i.e. for example $C_1$ for the section A in normal operation, assigns to each of the calling C T a position among the 32 positions of the outgoing PCM junction of the concentration circuit $C_1$. When the 32 positions are occupied, the subscribers of the non-allocated C T are no longer able to call and blocking occurs, which is of course a characteristic of concentration.

This allocation is made under the control of the concentration address memories M A $C_1$ to M A $C_3$. Each of these memories is organized into 32 words of 9 bits and controls the principal concentrator of the section to which it is assigned, and also the auxiliary concentrator of the section of preceding rank. For example M A $C_2$ controls $C_3$ and $C_2$. The content of the M A C is fixed in known manner by the control unit (not shown). Each of the 32 words is read successively in synchronism with the channel times of the P C M junctions, and their content opens in the concentrator a means (for example a gate) which connects the C T, of which the number is determined by the content of the word, to the P C M junction. In addition, the positioning of the coded signal arriving through the C T is established by known means which have not been shown (opening of the gate passes signals from a clock which empties a register for example). It is pointed out that 8 bits are sufficient for designating one circuit out of 256. The function of the ninth bit will be described hereinafter.

The P C M junctions are connected to the time-division input switches C T $E_1$ to C T $E_3$. Each C T E receives in parallel signals of the section in which it is situated and a signal from the auxiliary concentrator of the preceding section. For example C T $E_2$ receives the signals from $C_3$ and $C_2$. In conjunction with the simplification of two concentrators per section, we shall only describe the case where, in each section, the C T E only receives these two signals in parallel and is dimensioned accordingly, which does not affect the principle of its operation and does not limit the scope of the invention. These C T E are memories organized (for two parallel junctions) into 32 words of 8 bits and are filled by the 32 words of the frames present at the junctions, the first word of the frame filling the first word of the memory, etc. The content is regularly updated as the frames pass through, each word thus remaining constant for the duration of a frame.

The various words of a C T E are called and leave at an instant fixed by the control unit between the instants when they are updated. Accordingly, it can be seen that, in this way, they enter the C T E in a predetermined order and leave in another predetermined order, which is a characteristic of time-division switching.

This calling of the words of a C T E takes place under the control of the time-division address memories M A $T_1$ to M A $T_3$. Each of these memories is organized into 32 words of 8 bits of which the content is fixed by the control unit. These words are read successively and their content gives the address of the word which is to be called in the C T E corresponding to the M A C.

The words called in the C T E are then directed onto the busbars $B_1$ and $B_3$. There are as many busbars as there are sections, the output of one C T E being permanently connected to one of them, C T $E_1$ to $B_1$ for example.

In synchronism with the calling of the words of the C T E, the spatial swiches C $S_1$ and C $S_3$ connect the busbars to the time-division output switches C T $S_1$ to C T $S_3$. Accordingly, this enables a C T E of one section to be connected to a C T S of another section. On the other hand, it is obvious that the relative position of the busbars and the C S may be reversed, in which case the C T S are fixedly connected to the C S whilst the C T E are variably connected to these bars by the C S.

The C S are controlled by the spatial address memories M A $S_1$ to M A $S_3$. Each of these memories is organized into 32 words of $k$ bits of which the content is fixed by the control unit, $k$ being a number which is governed by the number of busbars and hence by the number of sections (for three sections for example $k = 2$). These words are read successively in synchronism with the reading of the words of the M A T and their content gives the number of the busbar to be connected by the C S corresponding to the M A S.

The C T S are memories organized (in the context of this simplified description, as seen earlier on) into 32 words of 8 bits, and are filled by the words of the frame which arrive successively from the C T E through the C S. This filling takes place under the control of the time-division address memories M A $T_4$ to M A $T_6$. Each of these memories is organized into 32 words of 8 bits of which the content is fixed by the control unit. These words are read successively and their content gives the address of the words where the word coming from the C T E is to be placed. Accordingly, although the C T S are filled in any order, this order is determined by the control unit, and the content of the words is updated as the frames pass through.

The words of the C T S are then regularly called one after the other, beginning with the first, and leave in the same order. The words are called by a cyclic device inside the memory. Accordingly, it can be seen that the C T S function symmetrically to the C T E, the words entering them in a predetermined order and leaving in another predetermined order.

Accordingly, there is at the output of each C T S a PCM junction which supports a frame of 32 telephone signal samples coded on 8 bits (still in the context of the same simplified description).

These outgoing junctions are connected to the deconcentration circuits, each junction being connected to the normal deconcentration circuit of its section and to the auxiliary deconcentration circuit of the preceding section. The deconcentration circuit in service, i.e. for example $D_1$ for the section A in normal operation, assigns to each of the terminal circuits (denoted in the Figure by the connections C T which terminate there) the corresponding word in the frame supported by the junction terminating at the deconcentration circuit. Only 32 C T can be fed by one deconcentrative circuit out of the 256 which are connected thereto, which represents genuine deconcentration.

This allocation is made under the control of the deconcentration address memories M A $D_1$ to M A $D_3$. It takes place in the same way as the concentration in the C under the control of the M A $C_1$, except that on this occasion the signals pass through the junctions towards the C T.

The structure of the M A C and M A D is the same and their content may be the same, so that they may be merged in two (M A $C_1 \equiv$ M A $D_1 \ldots$). The incoming C T of a subscriber carries the same number as the outgoing C T of that subscriber and he may receive the signals of his correspondent at the same time as he transmits his own. If one subscriber at a time is speaking, the signals he receives will be equal to 0 which is unimportant.

in order to illustrate the operation described above, we shall now describe the sequence of operations involved in a communication between a subscriber connected to the C T 85 of section A and a subscriber connected to the C T 72 of section B. We shall assume that, in the direction 85→72, the signals pass through the channel 22 of the outgoing P C M junction of $C_1$ along the time path 1 of C T $E_1$ and the channel 14 of the incoming junction of $D_3$, and that in the direction 72→85 the signals pass through the channel 14 of the outgoing P C M junction of $C_3$ along the time path 17 of C T $E_2$ and the channel 22 of the incoming junction of $D_1$. These routings are decided by the control unit in dependence upon the availabilities of the various paths.

Figure 2:
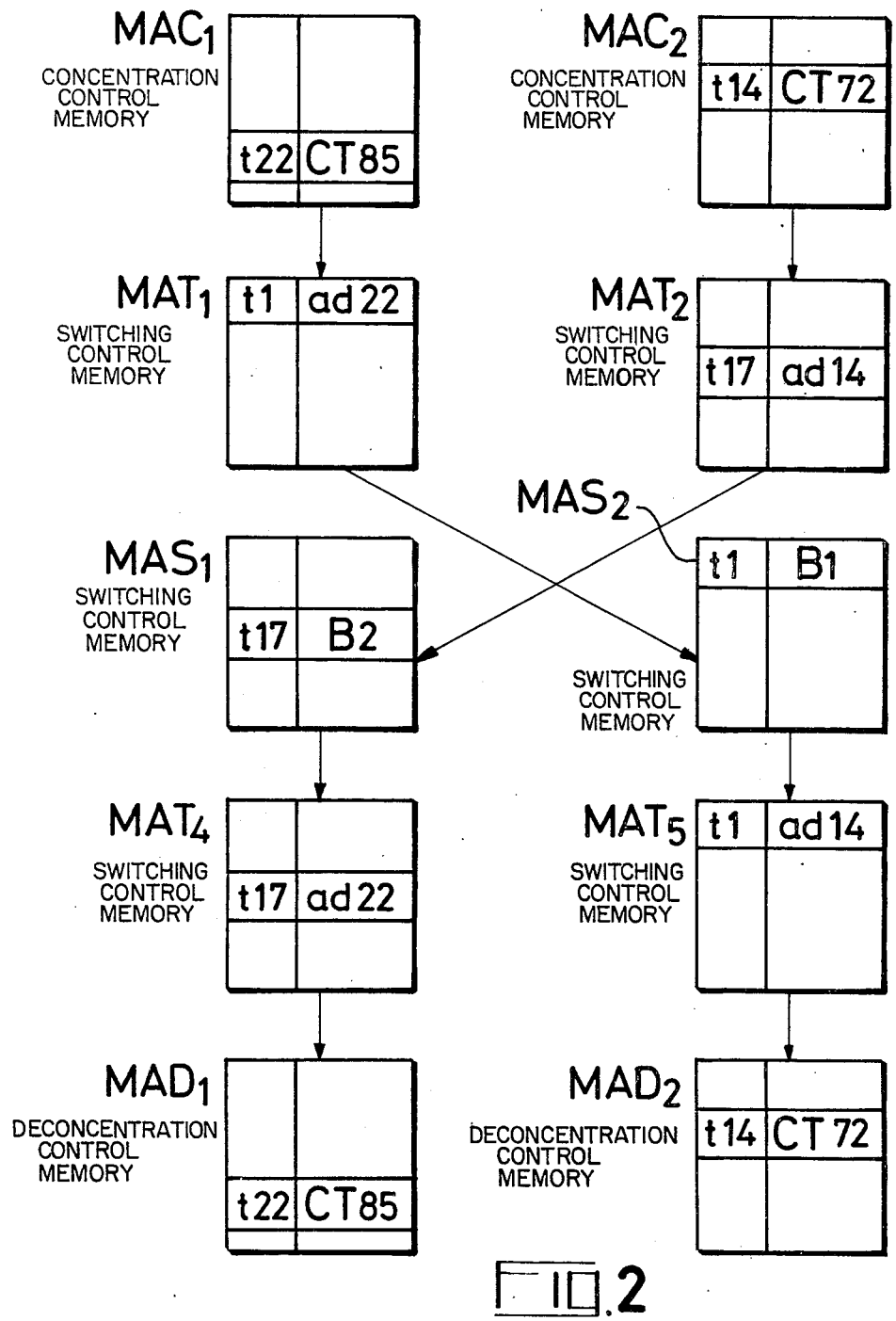
FIG. 2 illustrates symbolically some control memories of the exchange shown in FIG. 1.

FIG. 2 symbolically illustrates the content of the various memories M A C, M A T, M A S and M A D. The interior of the squares is divided into a left-hand part and into a right-hand part by a vertical line and comprises a section situated at a variable level. This section represents one word of the memory, its right-hand part indicating the elementary time at which the word is read and its left-hand part the symbolic content of the word. The arrows indicate the succession of memories in the following description.

All the memories are read simultaneously from the time 1 to the time 32 after which the cycle recommences. When the time at which an operation is to be carries out is below the time at which the preceding operation is to be carried out, it takes place in the following cycle; in other words the times are defined modulo 32.

In the direction 85→72:

at time $t_{22}$, reading in M A C$_1$ of the word No. 22 containing the address C T 85 of the terminal circuit which is to be connected. This address is delivered to C$_1$ which passes the coded signal of C T 85 at the outgoing junction of C$_1$. This signal is located in channel 22 of the frame of the junction; it therefore enters the word No. 22 of C T E$_1$.

at time $t_1$ (following cycle), reading in M A T$_1$ of the word No. 1 containing the address ad 22 of the word of C T E$_1$ which contains the coded signal. This address is delivered to C T E$_1$ where the word number 22 is read, delivering the coded signal to the busbar B$_1$.

at time $t_1$, reading in M A S$_2$ of the word No. 1 containing the number B$_1$ of the busbar which is to be selected by C S$_2$. This number is delivered to C S$_2$ which connects B$_1$ to C T S$_2$.

at time $t_1$, reading in M A T$_5$ of the word No. 1 containing the address ad 14 of the word of C T S$_2$ where the coded signal is to be written. This address is delivered to C T S$_2$ where the coded signal is written into the word No. 14.

at time $t_{14}$, reading in C T S$_2$ of the word No. 14; the coded signal which is read there is thus placed in channel 14 of the frame of the incoming junction of D$_3$.

at time $t_{14}$, reading in M A D$_2$ of the word No. 14 containing the address C T 72 of the terminal circuit which is to be connected. This address is delivered to D$_3$ which allows the coded signal initially transmitted by C T 85 to pass through on C T 72. The required connection has thus been established.

In the direction 72→85:

at time $t_{14}$, reading in M A C$_2$ of the word No. 14 containing the address C T 72 of the terminal circuit which is to be connected. This address is delivered to C$_3$ which allows the coded signal of C T 85 to pass through on the outgoing junction of C$_3$. This signal is placed in channel 14 of the frame of the junction, so that it enters the word No. 14 of C T E$_2$.

at the time $t_{17}$, reading in M A T$_2$ of the word No. 17 containing the address ad 14 of the word of C T E$_2$ which contains the coded signal. This address is delivered to C T E$_2$ where the word No 14 is read, delivering the coded signal to the busbar B$_2$.

at the time $t_{17}$, reading in M A S$_1$ of the word No. 17 containing the number B$_2$ of the busbar which is to be selected by C S$_1$. This number is delivered to C S$_1$ which connects B$_2$ to C T S$_1$.

at the time $t_{17}$, reading in M A T$_4$ of the word No. 17 containing the address ad 22 of the word of C T S$_1$ where the coded signal is to be written. This address is delivered to C T S$_1$ where the coded signal is written into the word No. 22.

at the time $t_{22}$, reading in C T S$_1$ of the word No. 22; the coded signal which is read there is thus placed in channel 22 of the frame of the incoming junction of D$_1$.

at the time $t_{22}$, reading in M A D$_1$ of the word No. 14 containing the address C T 85 of the terminal circuit which is to be connected. This address is delivered to D$_3$ which allows the coded signal initially transmitted by C T 85 to pass through on C T 85. The required connection has thus been established.

It is pointed out in particular that, in the present case, M A C$_1$ ≡ M A D$_1$ and M A C$_2$ ≡ M A D$_2$.

It has been seen that the C T are connected in parallel to two concentration circuits, and receive in parallel (for example through an "OR" circuit) the signals of two deconcentration circuits all situated in the same section. On the other hand, the C T E receive in parallel the signals of a concentration circuit of the section in question and those of a concentration circuit of the preceding section, and the C T S deliver their signals to a concentration circuit of the section in question and to a deconcentration circuit of the preceding section. Finally, each M A C controls one concentration circuit of its section and one of the preceding section, whilst each M A D controls one deconcentration circuit of its section and one of the preceding section.

It is at this level that the ninth bit of the words of the M A C and of the M A D intervenes because, in normal operation, this ninth bit has a constant value, for example 1, for all the words of all the M A C and all the M A D. The decoding of this value keeps closed all the auxiliary concentration and deconcentration circuits such as C$_2$, C$_4$, C$_6$, D$_2$, D$_4$ and D$_6$, and authorises connection to the normal concentration and deconcentration circuits of all the C T of the sections in question.

In the event of failure of any element (except for the C, D) of any section, for example A, the control unit detects this failure and positions at 0 the ninth bit of M A C$_1$ and M A D$_1$. C$_1$ and D$_1$ are thus closed and the faulty section I is isolated.

To ensure that, in spite of this, the traffic of the C T of 16 A can be diverted, when the control unit positions the ninth bit of part of the words of M A C$_2$ and M A D$_2$, it positions at 0 the ninth bit of some of these words. For example, the first 16 words have their ninth bit at 0, whilst the last 16 words have their ninth bit at 1. In this way, the C T of the section A are able to pass through C$_2$ to occupy the first 16 channels of the junction terminating at C T E$_2$, whilst the C T of section II are able to pass through C$_3$ to occupy the last 16 channels of that junction. Similarly, the first 16 channels of the junction coming from C T S$_2$ feed the C T of section A, whilst the last 16 channels of this junction feed the C T of section B. This distribution is by no means essential and the allocation of the channels of the junctions to the sections A and B may be arbitrary.

Thus, the traffic of the C T normally allocated to sections A and B can be diverted through section B. This obviously increases the concentration level of the lines, and, hence, the blocking level whilst leaving the other sections unaffected.

For this reason, it is of interest gradually to distribute the extra traffic created by the faulty section between all the other sections.

For this purpose, the control unit positions the ninth bits of the M A T and the M A T of the sections functioning properly in such a way that each section supports the same traffic. Thus, all the initial traffic of the faulty section passes through the lower section, whilst part of the initial traffic of this lower section passes through the following section, and so on, the amount of traffic transferred becoming smaller on each occasion.

For example, if the exchange shown in FIG. 1 is limited to the sections A, B and C shown, and if the section A is down, 100% of the initial traffic of section A will be transferred to section B, whilst 50% of the initial traffic of section B will be transferred to section C, which gives the following distribution:

| | | |
|---|---|---|
| - section B : | 100 % | of the initial traffic of section A |
| | 50 % | of the initial traffic of section B |
| - section C : | 50 % | of the initial traffic of section B |
| | 100 % | of the initial traffic of section C |

Sections B and C will thus handle 150% of the initial traffic of one section if it is assumed that the total initial traffic is uniformly distributed over the sections.

To this end the control unit positions $\frac{2}{3}$ of the ninth bits of M A $C_2$ to 0 and $\frac{1}{3}$ to 1, and $\frac{1}{3}$ of the ninth bits of M A $C_3$ to 0 and $\frac{2}{3}$ to 1. It will of course be the nearest integer values which will be selected, i.e. for example 22 and 11 because there are 32 ninth bits.

This distribution is the most interesting in the case where the traffic is equally distributed over the sections, although it is also possible to adopt another distribution in the case where, for example, it is desired to favour one section where the initial traffic is known to be greater than in the other sections.

It can be seen that, if the exchange is not organized into sections as described in the above example, but nevertheless comprises the organization of concentration and deconcentration circuits according to the invention, it is possible, if the circuits allocated to a junction are faulty to nevertheless distribute between the other junctions the traffic that is flowing normally through that junction. However, since the number of common elements will be considerably greater, the fault configurations which may thus be repaired are considerably reduced. Accordingly, the organization in sections enables the invention to be better applied.

On the other hand, it is obvious that, instead of accepting a reduction in the traffic capacity of an exchange with $n$ sections, it is possible to increase the initial size of this exchange for a given volume of traffic, for example using $n - 1$ sections.

Accordingly, it can be seen that an exchange of the kind in question may be used, by acting on the commands issued by the control unit, to concentrate groups of 512 C T among 64 spatial paths (taken at two P C M junctions) instead of 256 C T among 32 spatial paths. This considerably improves the blocking level.

In view on the one hand of the circuits available and on the other hand of the technology already used, it is of interest to use for the ninth bit that of the greatest weight, which is equivalent to adding one additional bit at the end of each word of the memories.

The foregoing description applies to the case where the concentration circuits act on already coded signals, although it is entirely possible to make them act on analogue signals and to carry out coding thereafter.

What we claim is:

1. A time-division exchange for connecting a plurality of incoming subscriber circuits in a number of groups to a plurality of output subscriber circuits in a number of groups, said exchange comprising:
   at least three pairs of concentration means one each of said groups of incoming subscriber circuits being simultaneously connected to both concentration means of one each of said pairs of concentration means;
   at least three pairs of deconcentration means, one each of said groups of output subscriber circuits being simultaneously connected to both deconcentration means of one each of said pairs of deconcentration means;
   at least three interconnected switching means one each of said switching means being simultaneously connected to a first concentration means of one each of said pairs of concentration means, to a second concentration means of a different one each of said pairs of concentration means, to a first deconcentration means of one each of said pairs of deconcentration means, and to a second deconcentration means of a different one each of said pairs of deconcentration means;
   at least three concentration control means, each of said concentration control means being connected to said first and second concentration means so as to share the load in the event part of said exchange becomes inoperative; and
   at least three deconcentration control means, each of said deconcentration control means being connected to said first and second deconcentration means so as to share the load in the event part of said exchange becomes inoperative.

2. An exchange as claimed in claim 1, divided into successive interrelated sections, each section comprising:
   at least one of said pairs of concentration means;
   at least one of said pairs of deconcentration means;
   one of said switching means, connected to one of the concentration means of that section, to one of the concentration means of the preceding section, to one of the deconcentration means of that section, and to one of the deconcentration means of the preceding section;
   one of said concentration control means, connected to said one of the concentration means of that section and to said one of the concentration means of said preceding section;
   one of said deconcentration control means, connected to one of the deconcentration means of that section and to said one of the deconcentration means of said preceding section; and
   a switching control means connected to said one switching means of that section.

3. An exchange as claimed in claim 2, wherein:
   each of said switching means includes means for switching PCM frames comprising $m$ channels;
   each of said pairs of concentration means is connected to $p$ incoming subscriber circuits;
   each of said pairs of deconcentration means is connected to $p$ output subscriber circuits;
   each of said concentration control means comprises a concentration memory of $m$ words of 1 concentration bits, 1 being equal to the number of bits required for coding the number 2 $p$; and
   each of said deconcentration control means comprises a concentration memory of $m$ words of 1 deconcentration bits, 1 being equal to the number required for coding the number 2 $p$.

4. An exchange as claimed in claim 3, wherein each of said concentration control means includes means for using a particular one of said concentration bits for selecting one of the two concentration means connected to the concentration control unit; and
   each of said deconcentration control means includes means for using a particular one of said deconcentration bits for selecting one of the two deconcentration means connected to the deconcentration unit.

* * * * *